Figure 1:
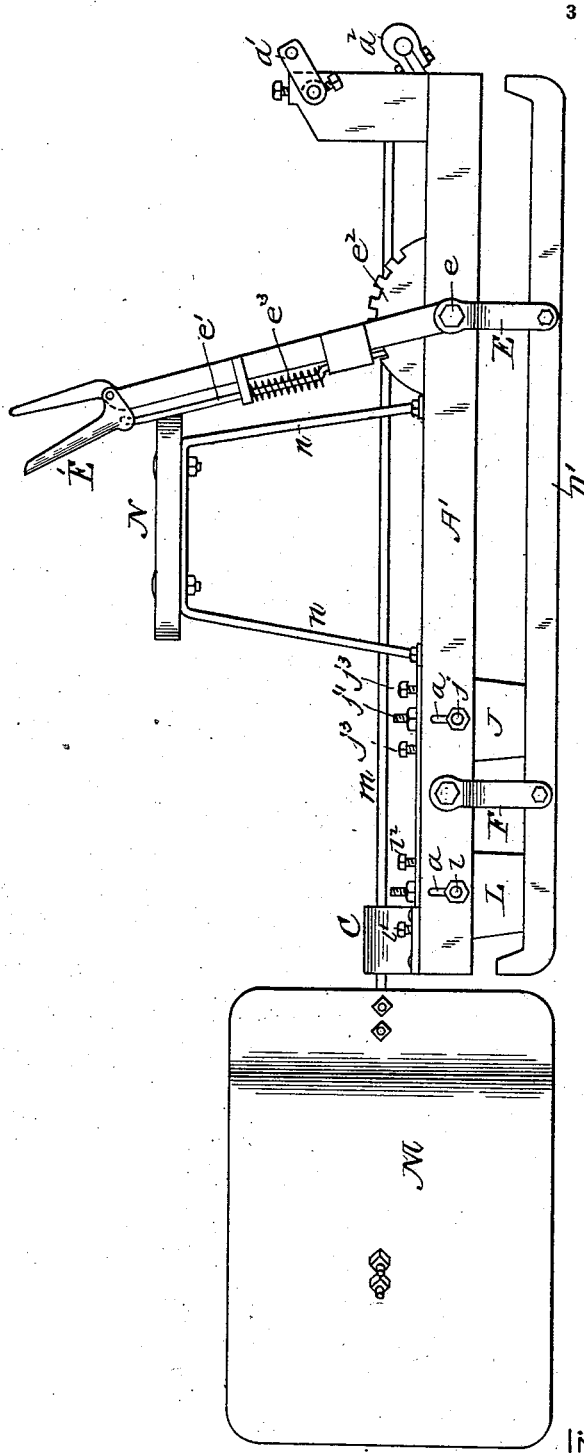

No. 715,955. Patented Dec. 16, 1902.
H. BODENSTEIN.
ICE PLANE.
(Application filed Feb. 24, 1900.)
(No Model.) 3 Sheets—Sheet 1.

WITNESSES
INVENTOR

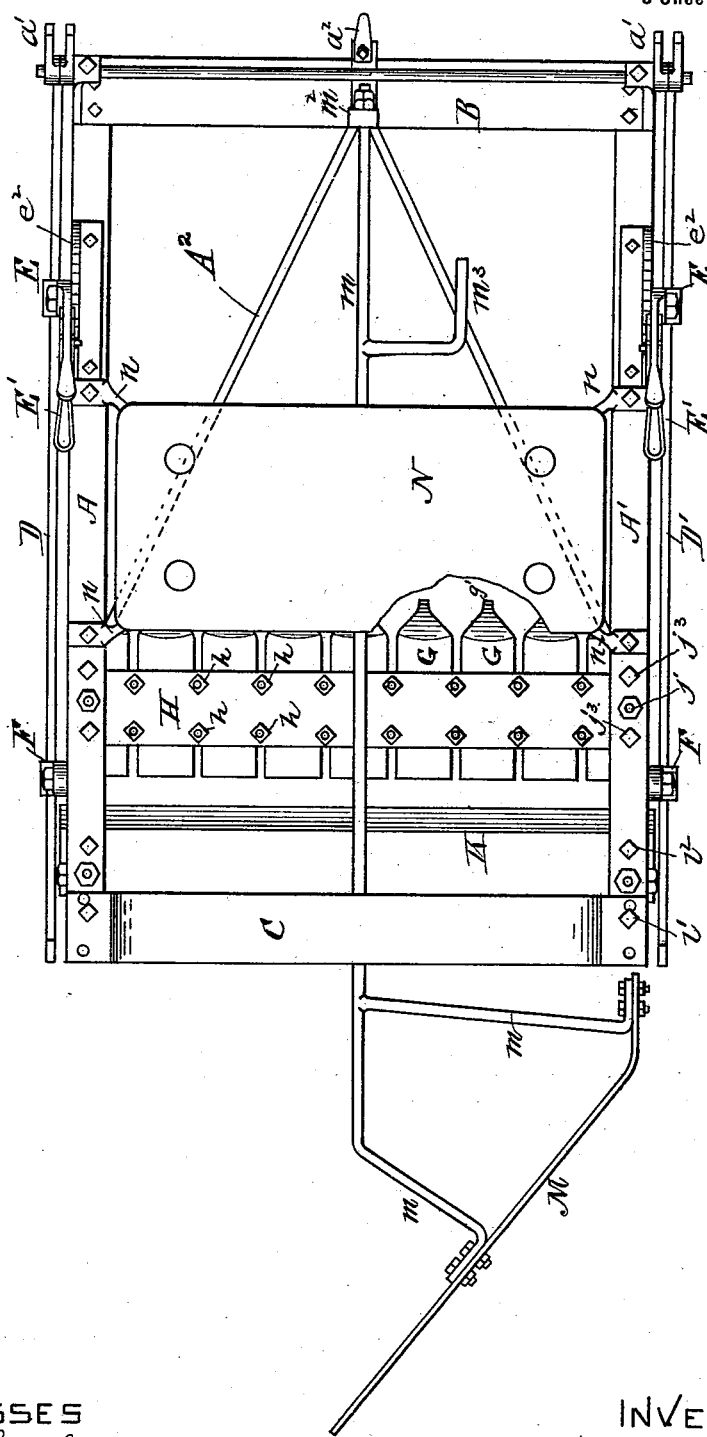

No. 715,955. Patented Dec. 16, 1902.
H. BODENSTEIN.
ICE PLANE.
(Application filed Feb. 24, 1900.)
(No Model.) 3 Sheets—Sheet 3.
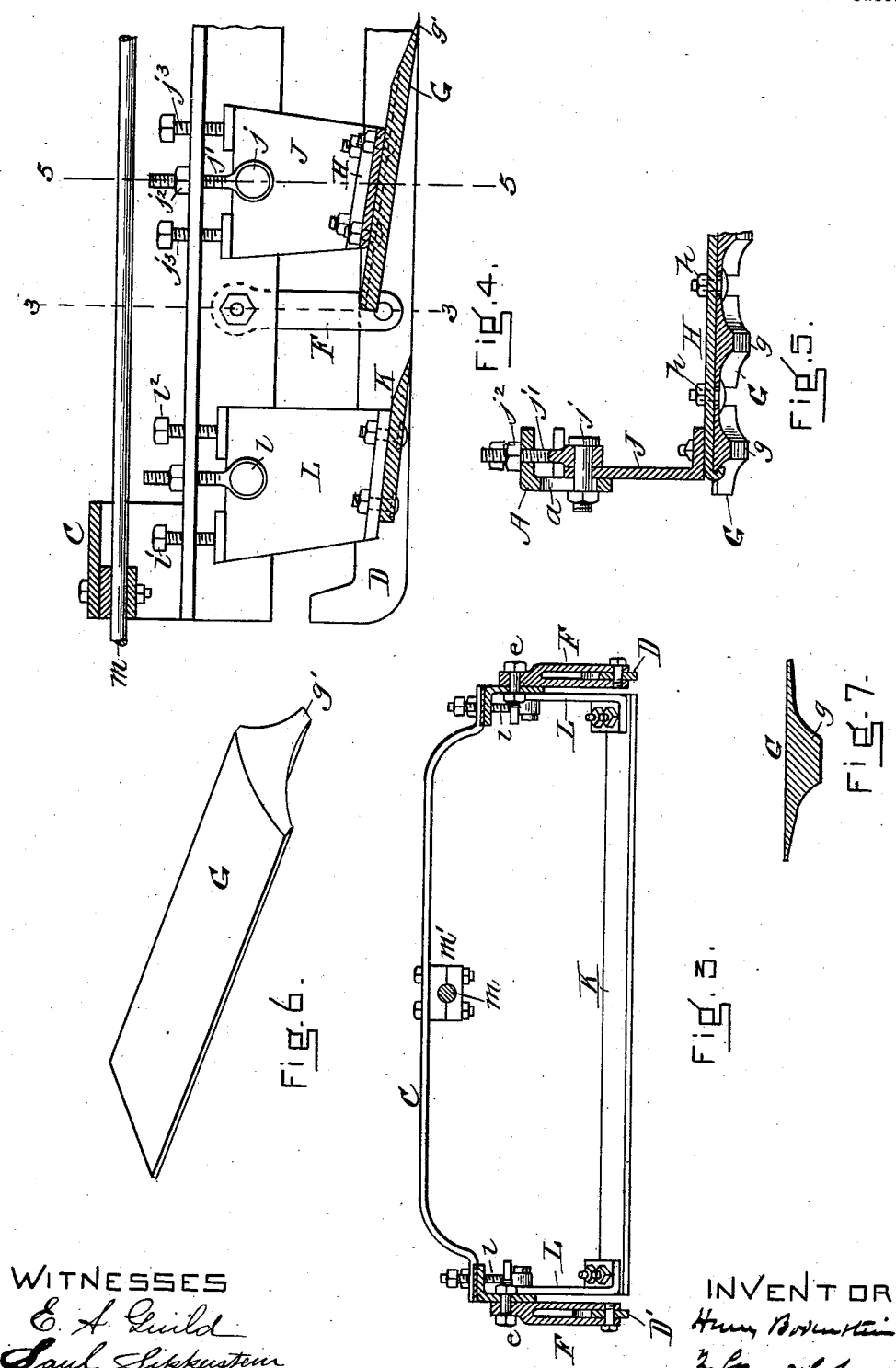

UNITED STATES PATENT OFFICE.

HENRY BODENSTEIN, OF ARLINGTON, MASSACHUSETTS, ASSIGNOR TO WILLIAM T. WOOD & COMPANY, OF ARLINGTON, MASSACHUSETTS, A FIRM.

ICE-PLANE.

SPECIFICATION forming part of Letters Patent No. 715,955, dated December 16, 1902.

Application filed February 24, 1900. Serial No. 6,396. (No model.)

*To all whom it may concern:*

Be it known that I, HENRY BODENSTEIN, of Arlington, in the county of Middlesex and State of Massachusetts, have invented a new and useful Improvement in Ice-Planes, of which the following is a specification.

In cutting ice it is sometimes desirable that the top surface of the ice shall be smoothed off before the cutting begins to remove from it the snow-ice or the dust or other impurities which may have been frozen onto the surface. This requires the planing of the ice to the depth sometimes of an inch or more, and it requires also a machine having considerable strength, for the reason that often the frozen matters are frozen hard to the surface. Moreover, it is sometimes desirable that a plane of this kind should have two knives, the first adapted to remove the foreign matter and give a preliminary smoothing to the ice, the second located behind it to give the required smoothness, or if a very deep cut is to be made the two knives may be set at different levels, so that when the cutting is to be, say, three inches in depth the front knife shall cut to a depth of an inch and a half and the rear knife an inch and a half deeper. Moreover, it is also desirable that the plane as a whole shall be supported upon runners in such a manner that the height of the knives above the level on which the runners are operating may be adjusted, and also that the runners may be separately adjusted with reference to the plane for reasons to be more fully described below.

My invention consists in a planer which embodies these several features and will be fully understood by reference to the drawings, in which—

Figure 1 is a side elevation, and Fig. 2 is a plan, of a planer embodying my invention, Fig. 3 being a sectional detail, Fig. 4 a longitudinal sectional detail showing the mode of hanging the knives, and Fig. 5 a sectional view on line 5 5 of Fig. 4. Fig. 6 is a detail of a corrugating knife-blade, and Fig. 7 is a detail view of a form of knife-blade.

A A' represent two angle-irons, one on each side of the planer, which form the side bars of the frame. These two angle-irons are joined together in front by a cross-bar B and in the rear by an arch-bar C.

D D' are runners, which are hung from the angle-irons A A' by means of forked links E F. The rear links F are each so bolted to its angle-iron A or A' and its runner that it may turn with relation to each. Each front link E is, in fact, a lever fulcrumed to an angle-iron A or A' at $e$, its lower end being pivotally bolted to its runner and its upper part being extended into a handle carrying a gripping-lever E', which has attached to it a latch-rod $e'$, adapted to engage with the teeth in the segment $e^2$, mounted on one of the angle-irons A A', $e^3$ being a spring to hold the lower end of the latch-rod $e'$ in the teeth on the segment $e^2$, this construction, so far as it relates to locking the link E in position, being a well-known construction. It will be seen that by moving either link E in either direction (which can be done by first unlocking its latch $e'$ from engagement with its segment $e^2$ by means of the handle E') its runner may be raised or lowered with relation to the frame.

In the machine shown in the drawings the planing-knives are of two kinds. The knife toward the front of the planer, which gives a preliminary cutting to the ice, is preferably made up of blades shaped as shown at G in Fig. 2, each being somewhat pointed and having a cutting edge $g$ where it strikes the ice and making a groove in the ice, the knife as a whole corrugating the surface of the ice. These blades are held in place upon the knife-bar H by means of bolts $h$. It will be seen from Fig. 5 that the bolts $h$ have large heads—large enough to overlap the adjacent sides of two of the blades G. Each bolt passes up through the knife-bar H and is held in place by a nut, and each blade is held by four bolts. The knife-bar H is hung upon hangers J, adjustably carried by the angle-irons A A'. I prefer to adjust the level of the knife as well as the angle at which it strikes the ice, and for these purposes I prefer to use the following mechanism: Each hanger is connected to its angle-iron by the bolt $j$, which passes through a slot $a$ therein and about which it may be turned. This bolt also passes through an eyebolt $j'$, which passes up through the horizontal portion of the angle-iron A A' and is there held by the nut $j^2$. By turning this nut the eyebolt may be raised or lowered. Through the horizontal portion of the angle-iron also passes two set-screws $j^3$, which bear upon the top of the hanger on each side of the pivot-bolt $j$. By screwing down one of these screws and unscrewing the other the hanger will be turned about the pivot $j$ and the angle of the knife-bar will be varied accordingly, and the pivot-bolt may be set up by its nut, if thought best, to aid in holding the knife in place. By these means the angle of presentation may be altered without changing the level of the edge of the knife, which, except as hereinafter specified, should be in the same plane with the lower edge of the runners when in their lowest position.

The smoothing-knife is shown at K. It consists, preferably, of a single blade bolted at each end to hangers L, which are similar in construction to the hangers J, being connected to the angle-irons A A' by bolts $l$, about which they may be turned, and being adjusted in place by bolts $l'$ $l^2$, passing through the top of the angle-iron. As intimated above, the rear knife may be constructed like the front knife, and many users would so prefer it, as it leaves the surface of the ice in corrugated condition, such as is preferred by many packers.

In addition to the means shown for smoothing the ice I have provided a reversible scraper M to scrape off the chips which the knives have cut. This scraper is supported by the rod $m$, to which it is suitably attached and braced, said rod $m$ being supported in a bearing $m'$ on the arch-bar C as well as by a bracket $m^2$, attached to the cross-beam B. It is provided with a handle $m^3$, located just in front of the seat N, by means of which it may be easily turned from one side of the machine to the other, so as to make a path through the chips on either the right or left hand for the horse to travel in. I have shown this scraper mounted on a horizontal axis in order that in use it may adjust itself to any chance irregularities of the surface of the ice, this feature being, I believe, new with me. The location of the handle in front of the seat is also new so far as I know and is of great utility in the operation of the planer.

In use the planer may be provided either with shafts attached thereto by the lugs $a'$, which are carried by the cross-bar B, or by the clevis $a^2$, also attached to the cross-bar B. By means of the lugs $a'$ shafts or a pole may be attached to the plane, so that the plane and the shafts or pole are practically one structure and the plane will surely follow in the path of the horse, and when in addition one of the knives is made up of separate blades, like the blades G, with ordinary care the path of the plane may be absolutely determined by the direction in which the horse is driven, the separate blades of the knife G serving, together with the rigid connection between the shafts and the plane, to keep the plane from slewing off onto the already-cut surface. The clevis $a^2$ is useful at times in drawing the plane from one ice-field to another.

Upon the frame is supported on four legs $n$ a seat N, and the driver is there in position to raise or lower either one of the runners by means of the levers E. I prefer to brace the frame by a V-brace $A^2$, which is attached to the cross-bar B by the bolt which holds the clevis $a^2$ in place, its ends extending rearward to the angle-irons A A', being attached thereto, preferably, by the bolts which hold two of the legs $n$ of the seat in place.

It will be noted that the handles E', by means of which the links E are operated to change the relative position of the runners, are located, as shown in the drawings, alongside or slightly in front of the driver as he sits on the seat N, so that upon approaching any obstruction which requires him to change the level of either or both of the runners with relation to the knives he can do so without leaving his seat and without stopping the plane. This feature I believe to be absolutely new in an ice-plane, and it makes my plane a great improvement over any plane heretofore constructed, so far as I know, for the reason that it enables one man—namely, the driver—to have absolute control over the plane instead of requiring two for this purpose.

In planing ice it is desirable that the strip along the border of the field shall slope gradually from the edge to the bottom of the furrow. By raising the runner next to the field to be planed the knife will cut as deeply as the raising of the runner will permit, while on the other side, the runner being left at its lowest point, the knife cannot cut. In this way the desired slope will be formed. By this means also patches of snow-ice can be removed from an ice-field and leave a level surface. Having gone once across the ice and made a smooth path or furrow, when next crossing one runner may run on the furrow, the edge of the furrow serving as a guide to the runner; but as the other runner will ride on the unplaned ice, which is higher than the planed surface, the knives would not be carried in horizontal position unless the upper runner were raised with reference to the frame. These are important features of my plane and, so far as I know, have never been adopted in any other device of this class. When a shallow cutting is to be made, the knives are ordinarily adjusted to the level of the bottom of the runners when the runners are in their lowest position, and unless rough or corrugated ice is desired the rear knife may be a single straight-edged blade, as is shown in the drawings; but I do not mean to limit myself to the use of such a knife as the rear knife, for it is often desirable to leave a roughened or corrugated surface to the ice, and in that case the rear knife should be so made as to accomplish this result. Moreover, as above suggested, the rear knife may be at a lower level than the front knife to enable the planer to cut a deep furrow in one cutting, each knife doing a portion of the work only.

I have shown above the best form of my invention now known to me; but it is evident that the adjustments referred to may be made in other ways than that shown and the construction may be varied somewhat without departing from the spirit of my invention. A third set of knives may be introduced, if thought best, when, for example, the depth to be cut is considerable.

The knife-blade G, which I prefer to use, is provided with a rib $g$ on one of its wide sides and is narrowed down at one end to substantially the width of the rib, that end having a chisel edge $g'$. Such a blade may be used either side up with good results, though it should be remembered that in setting the blade with relation to the ice-level so as to get the best results the angle of the plane of the under side of the blade with relation to the ice-level should be taken and never the angle of the plane of the upper side thereto.

What I claim as my invention is—

1. The ice-plane described consisting of a frame with driver's seat, pivotally-mounted hangers supported from said frame, knife-bars carried by said hangers, and means for adjusting the angle of the knife-bars without changing the level of the edge of the knife-bar.

2. The ice-plane described consisting of a frame with driver's seat, pivotally-mounted hangers supported from said frame, knife-bars carried by said hangers, means for adjusting the angle of the knife-bars without changing the level of the edge of the knife-bar, and means disposed within easy reach of the driver's seat for adjusting the level of each runner independently of the other.

3. In an ice-plane the combination with the frame and links mounted thereon, of runners carried by said links, a lever movable with one of said links, hangers pivotally suspended from said frame, knives carried by said hangers, and means for moving either hanger independently of the other for changing the angle of said knives, substantially as described.

4. In an ice-plane, a frame, runners pivotally suspended therefrom, a pair of hangers pivotally supported from said plane, a knife carried by said hangers and means mounted in said frame and bearing upon the upper side of the hangers for changing the inclination of the knife, substantially as shown and described.

5. In an ice-plane provided with a suitable knife-holder mounted upon a horizontal axis, and means whereby the level of said axis with relation to the frame may be adjusted, and means whereby the angle of presentation of the knife may be adjusted about said axis, said frame being mounted upon runners, one at each side thereof, the level of each runner being adjustable with relation to the level of the knife-edge whereby not only may the level and position of the knife-edge with relation to the frame be made adjustable, but its level with relation to the ice-surface may also be made adjustable, as set forth.

6. In an ice-plane, in combination with a frame suitably supported to run upon the ice, one or more pairs of hangers, each pair carrying a knife, said hangers depending from said frame by suitable eyebolts, in combination with adjusting-screws passing through the horizontal portions of said angle-iron, one on each side of said eyebolt and adapted to bear upon the upper side of one of said hangers, as and for the purposes set forth.

7. In an ice-plane, a frame, one or more knife-bars supported therein, a seat located thereon and a scraper located in the rear of the plane, said scraper being mounted on the rear end of a rod, suitably supported on said plane, the front end of said rod being provided with a handle located in front of said seat, as and for the purposes set forth.

8. The knife-blade above described consisting of a bar having a longitudinal rib extending along its under surface and projecting in front to form a narrow chisel-point, which point broadens out on each side of said chisel-point as it extends rearward to meet the sides of the bar, and thickens upward to meet the upper surface of said bar, as and for the purposes set forth.

In testimony whereof I have hereunto set my name this 16th day of February, 1900.

HENRY BODENSTEIN.

Witnesses:
STEPHEN B. WOOD,
W. THORNING WOOD.